United States Patent [19]
Gerber

[11] 3,763,771
[45] Oct. 9, 1973

[54] STACKER VEHICLE
[76] Inventor: Jerome J. Gerber, Murdock, Kans. 67111
[22] Filed: Apr. 24, 1972
[21] Appl. No.: 246,880

[52] U.S. Cl. ............... 100/100, 100/233, 214/508, 214/9, 56/346
[51] Int. Cl. ........................ B60p 1/30, B60p 1/38
[58] Field of Search .................. 214/506, 508, 9, 214/501; 100/100, 233, 214; 56/346, 344

[56] References Cited
UNITED STATES PATENTS
1,912,232   5/1933   Wehrhahn et al. ............. 214/508 X
3,691,741   9/1972   White et al. ................... 214/508 X Primary Examiner—Albert J. Makay
Attorney—John H. Widdowson

[57] ABSTRACT

A stacker vehicle receives material and unloads same in a stack on the ground. It has a ground supported bed. A conveyor and a stack enclosure to receive material are mounted on the bed. The enclosure is connected to the conveyor to move therewith. Means to tilt the enclosure, and operate the conveyor are provided.

7 Claims, 10 Drawing Figures

PATENTED OCT 9 1973 3,763,771

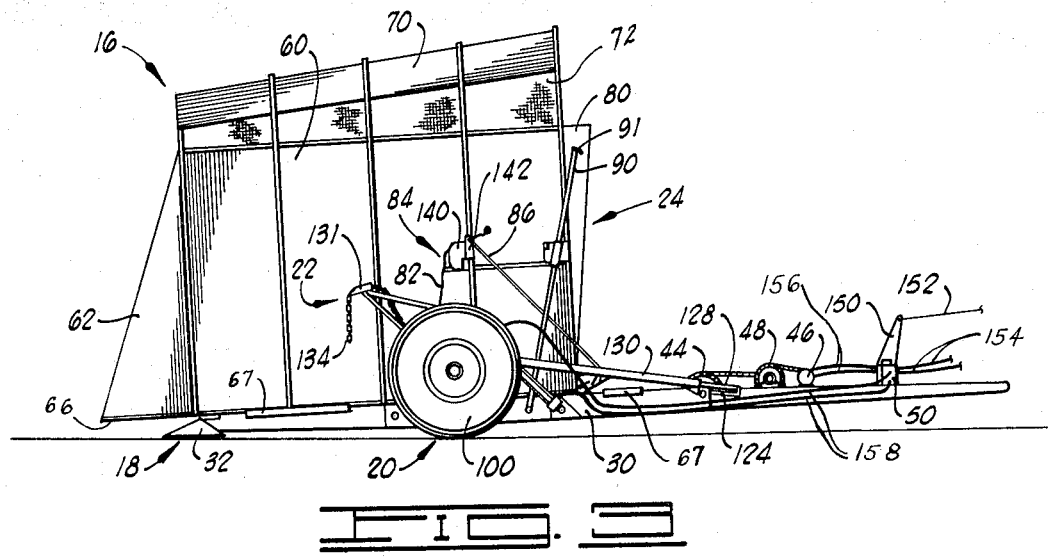
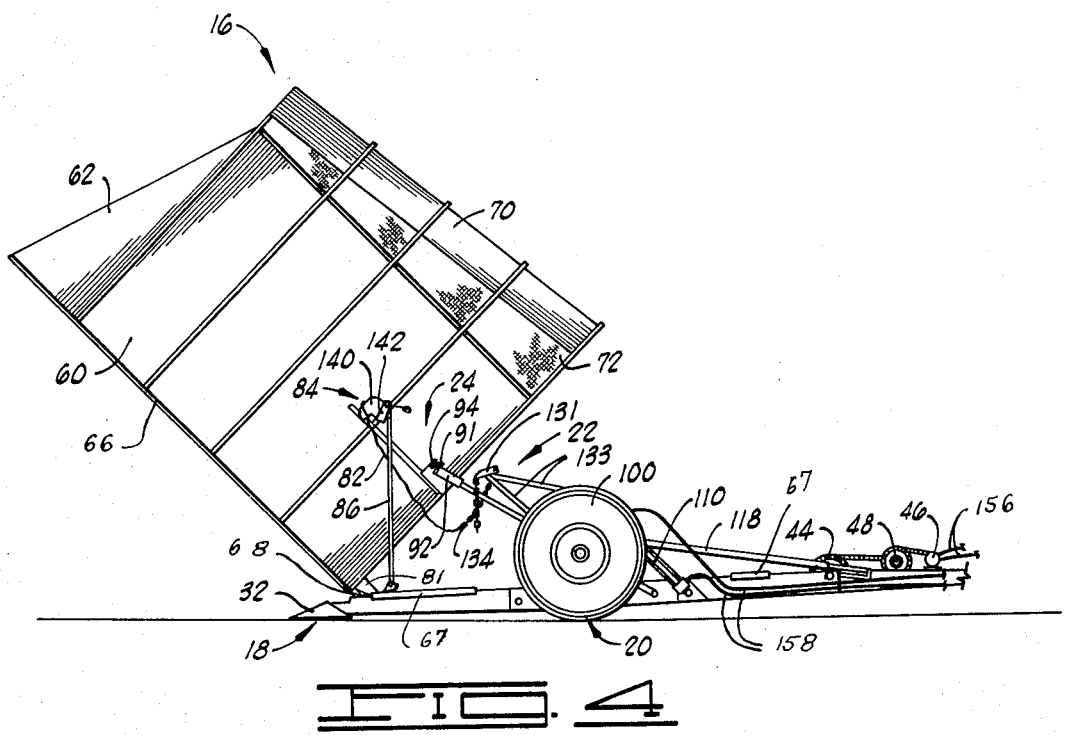

STACKER VEHICLE

Numerous types of haystackers and other devices for collecting and stacking of chopped material such as hay are known in the prior art, such being operable in conjunction with tractors and harvesting devices well known in the farm implement art. However, prior art material stackers have several disadvantages in their structure which cause problems in obtaining uniform stacks with surfaces that will shed water. Also, these prior art devices also have a disadvantage of being a mechanically complicated structure requiring several separate controls for operation and some such devices require several people in order to properly operate them. The more commercially popular types of stacker vehicles are basically a rectangular box-like structure mounted on a trailer which is filled with chopped material, these vehicles are provided with means to open the rear end of the box by a multiplicity of hydraulic cylinders, etc., so the trailer when lowered to the ground can be unloaded from the rear; in the alternative, the enclosure can be raised vertically from the stacked material and the trailer pulled under it. The disadvantage of these types of prior art devices is the quantity of hydraulic and other machinery necessary to raise the structure or open the structure for the removal of the stack. Additionally, the stack produced by these types of prior art devices characteristically has rough edges, thus do not shed water which is necessary for stacks that are left outside in the open.

In one preferred specific embodiment, a stacker vehicle structure includes a trailer-like bed having wheels which can be raised and lowered, thereby providing means to lower the bed to the ground, a housing above the trailer-like bed to enclose chopped material attached to a conveyor integral with the bed, and having shaking and compressing devices adapted to compress chopped material loaded in the housing. The stacker vehicle is adapted to be pulled behind a material chopping and blowing device or forage harvester of the conventional type. In operation, the stacker vehicle, of this invention, is adapted to be pulled behind the forage harvester and filled with chopped material; when said vehicle is full it is moved into position where the stack is to be located and the stack is unloaded. Prior to unloading the stack from the stacker vehicle, the shaker device and the compressing device can be used to compress the stack inside the housing in order to more solidify the stack so that it will hold its shape once placed on the ground. In the unloading operation the trailer or bed is lowered to the ground and the conveyor operated in a rearward direction thereby moving the housing and the enclosed stack to the rear; simultaneously the tractor must pull the bed forward at the same rate which the conveyor moves rearward. As the housing moves toward the rear portion of the bed, the housing tips with the rear end thereof raising, thus uncovering the stack as it is set on the ground with the sides formed in the shape of the housing and virtually undisturbed by the removal of the housing from the stack. When the trailer bed is moved completely forward and away from the stack, the housing is in its completely tipped position and then can be repositioned for use again.

One object of this invention is to provide a stacker vehicle structure overcoming the aforementioned disadvantages of the prior art devices.

Still, one other object of this invention is to provide a stacker vehicle structure having a housing mounted on a trailer bed adapted to be pulled behind a chopping and blowing forage harvesting device with the housing tiltable on the bed and the bed having a conveyor to move the stack in an undisturbed condition from the bed.

Still, another object of this invention is to provide a stacker vehicle structure which has a housing to enclosed chopped material that is shaped to provide a stack having tapering sidewalls and being larger at the bottom, which can be removed from the stacker vehicle in a substantially undisturbed condition thereby producing a finished stack with relatively smooth sides that will have good water repellent characteristics.

Still, another object of this invention is to provide a stacker vehicle structure which has a single control adapted to raise and lower the bed structure relative to the ground and operate the conveyor which can be operated by one person.

Yet, one other object of this invention is to provide a stacker vehicle structure which has a housing with a movable sidewall which can be used to compress the stack inside of the structure when the vehicle is stopped and another compressing device adapted to shake the bed structure as the vehicle is pulled.

Yet, another object of this invention is to provide a stacker vehicle structure which has separate controls for the hydraulic apparatus used to raise and lower the bed structure relative to the ground and for the compressing devices thereof, which require only one person for the operation thereof.

Various other objects, advantages, and features of the invention will become apparent to those skilled in the art from the following discussion, taken in conjunction with the accompanying drawings, in which:

FIG. 4 is a side elevation view of the stacker vehicle in the wheels up position with the housing in the full tilted position;

FIG. 5 is a front elevation view of the stacker vehicle in the wheels up position taken from in front of the hitch;

Figure 1:
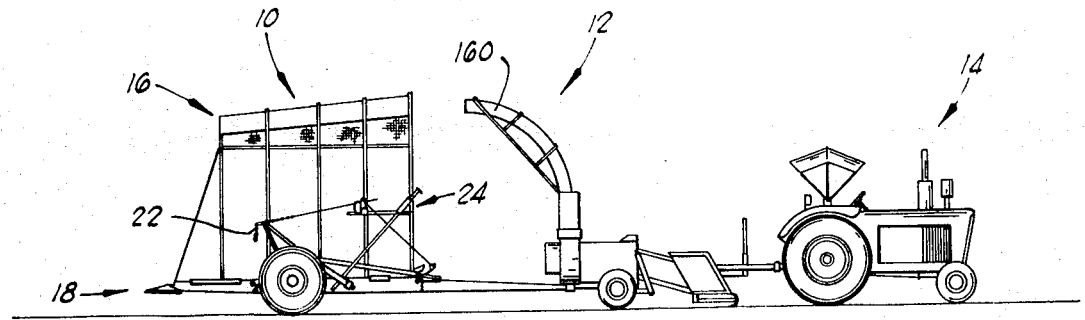
FIG. 1 is a side elevation view of the stacker in the loading configuration positioned behind and connected to a blowing and chopping forage harvester device and a tractor.

The following is a discussion and description of the preferred specific embodiments of the stacker vehicle structure of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a side elevation view of the stacker vehicle structure of this invention, generally indicated at 10, it is shown attached to a forage harvester, indicated at 12, which is in turn attached to the rear of a tractor, indicated at 14. The stacker vehicle structure 10 includes a housing, indicated at 16, mounted on a wheeled trailer-like bed structure, indicated at 18. The bed structure 18 for the stacker vehicle is adapted to be raised and lowered relative to the ground by the wheel assemblies 20; it has a compressing device 22 and a shaking device 23 connected to the wheel assembly 20. A locking and tilting device 24 is connected between the bed structure 18 and housing 16 and is used when the housing is tilted. In normal loading operation the stacker vehicle 10 is connected by a hitch to the forage harvester or other similar chopping and blowing device 12 which is in turn connected to the tractor 14. In operation the combination is pulled through the field to pick up cut material and transfer it via the chopping and blowing device 12 into the stacker vehicle 10. When the stacker vehicle is full of chopped material, it is moved to where the stack is to be placed. The stacker vehicle 10 is unloaded as will be described in the hereinafter. An additional use of the herein described stacker vehicle is for moving previously placed stacks by reloading them onto the vehicle, moving them to another location and placing them on the ground again.

Figure 6:
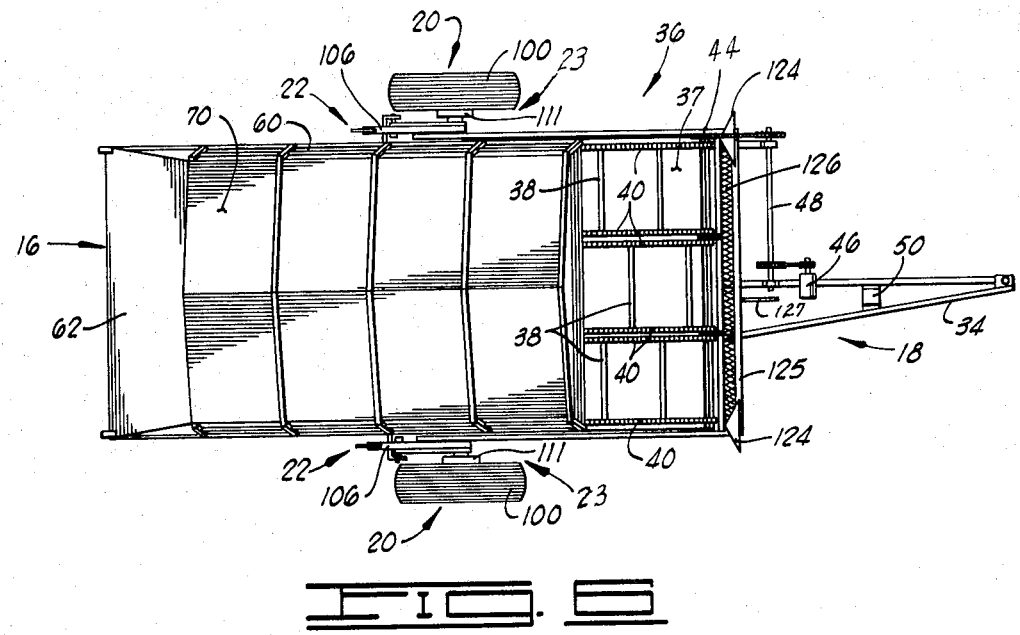
FIG. 6 is a top plan view of the stacker vehicle in the wheels up position with the housing moved rearward as in FIG. 3.

FIG. 6 shows details of construction for the stacker bed structure. The stacker vehicle bed structure 18 is constructed somewhat like a trailer and includes a rectangular frame structure indicated at 30, with a fork 32 extending across the rear thereof, a tongue structure 34 extending from the forward end of the frame 30 to be connected with another vehicle for pulling, and a conveyor, indicated at 36, within the rectangular frame structure. The conveyor apparatus 36 is adapted to move the stack and the housing rearward on the bed structure. The conveyor apparatus 36 is constructed around the floor surface 37 of the bed structure 18 and substantially covers the area between the sides of the bed frame structure 30. The conveyor apparatus 36 has individual slatted segments with the slats indicated at 38, positioned side by side on the floor and extending the length thereof. Each of the slatted conveyor segments has a pair of chains 40 with slats 38 mounted between them. The chains 40 are connected around the floor attached to a forward drive mount indicated at 44 and a rear driven mount (not visible in the drawings). The conveyor apparatus 36 is driven from a hydraulic motor 46 through an intermediate shaft assembly 48 connected by chains and sprockets to the front drive mount 44. The drive mount 44 is positioned at the forward most end of the bed floor. The hydraulic motor 46 and intermediate driving shaft assembly 48 are mounted forward and ahead of the bed frame structure 30 as shown in FIG. 6 and FIG. 2.

Figure 9:
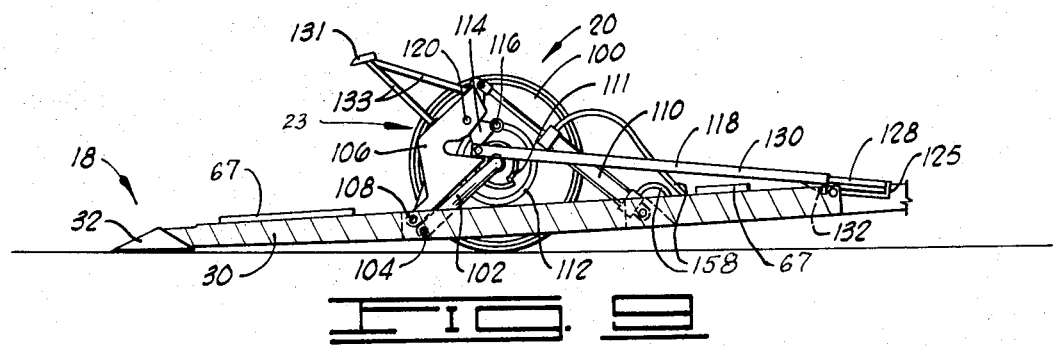
FIG. 9 is an enlarged side elevation view of the rear portion of the stacker vehicle in the lowered position showing the wheel assembly.
Figure 10:
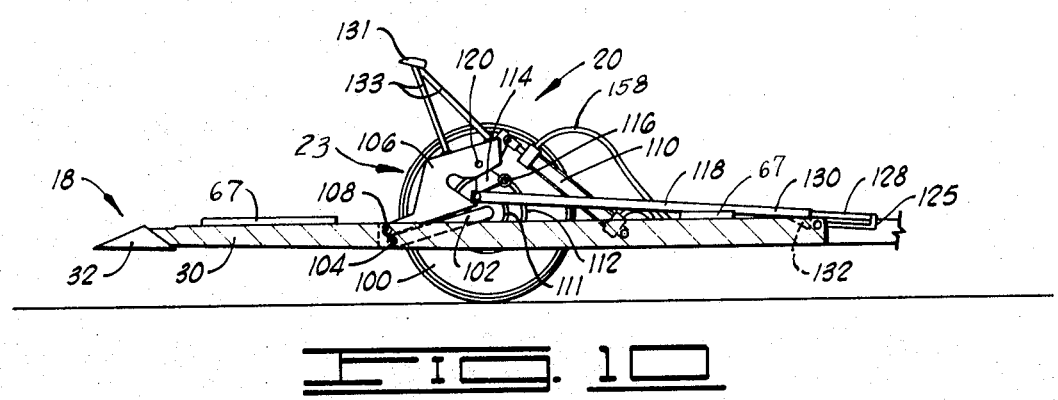
FIG. 10 is an enlarged side elevation view of the rear portion of the stacker vehicle in the raised or wheels down position showing the interior of the wheel assembly.

The wheel assemblies 20 are attached to the side members of the bed frame structure 30 as shown in detail in FIGS. 9 and 10. The overall function of the wheel assemblies 20 is to transport the stacker vehicle and provide a means to raise and lower the bed structure 18 relative to the ground, upon control by the operator. In the raised or wheels down position the bed structure is as shown in FIG. 1, substantially parallel to the ground surface. In the lowered or wheels up position the bed structure is as shown in FIGS. 2, 3, 4, 7, and 8 wherein the fork 32 on the rear of the bed structure is in contact with or immediately adjacent to the ground surface. The conveyor assembly 36 is constructed substantially within the frame structure 30 and its operation is not interferred with by the lowering of the fork 32 to the ground. When the wheel assemblies 20 are raised thereby lowering the bed structure, the vehicle is in a tilted attitude as shown in FIG. 2 since the hitch on the forward end of the tongue is attached to some pulling vehicle and the fork 32 is at ground level.

Figure 2:
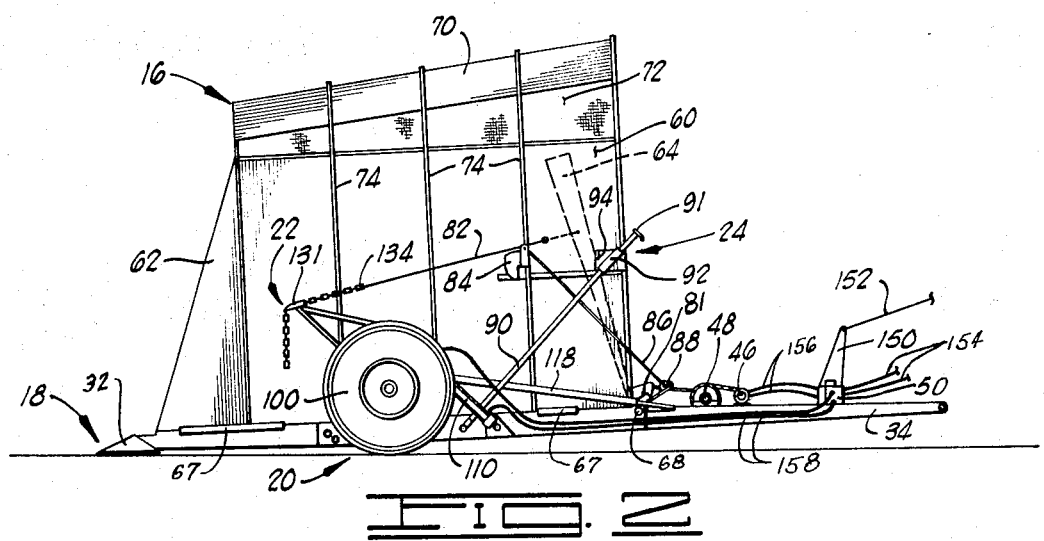
FIG. 2 is a side elevation view of the stacker vehicle in the wheels up condition with the movable housing wall shown in dashed lines.

The housing structure is best viewed for purposes of description in FIGS. 2, 5, and 6. The housing structure includes sidewalls 60 on the opposing sides of the structure, a rear wall 62 on the back of the structure, and a front wall 64 pivotally attached to the front of the structure. As can be seen in FIG. 6, the sidewalls of the housing structure 16 are tapered inward at the upper portion and are joined by a top. The lower portion of the sidewalls 60 and rear wall 62 are joined to a lower housing frame indicated at 66 which contacts the bed frame structure 30 and fits inside guide members 67 attached to the frame structure's sides. The lower housing frame 66 is attached to the conveyor assembly 36 on the forward end of the housing as indicated at 68 in FIG. 4. The top of the housing structure 16 includes an imperforate cover portion 70 on its upper portion and a perforate screen-like section 72 below the cover 70 and above the sidewalls 60 as shown clearly in FIG. 2. The housing top 70 is supported above the sidewalls 60 on the housing vertical frame members 74. The forward wall 64 extends about two-thirds of the way up the forward side of the stacker vehicle and provides an opening, indicated at 76, between its upper edge and top of the stacker housing 70, as shown clearly in FIG. 5. The forward wall 64 is pivoted at its lower portion and shaped to contact the sidewalls of the housing. The very function of the pivotable forward wall 64 is to be pulled rearward and used to compress material loaded into the stacker. The forward wall 64 has a flat center portion 78 and slanted outer portions 80 turned back into the housing 16 so as to act as a seal against the sidewalls 60 when moved rearward compressing chopped material. A hook-like catch 81 is provided on the forward outer and lower portion of the housing 16 to engage the bed structure when the housing is fully tilted.

Figure 7:
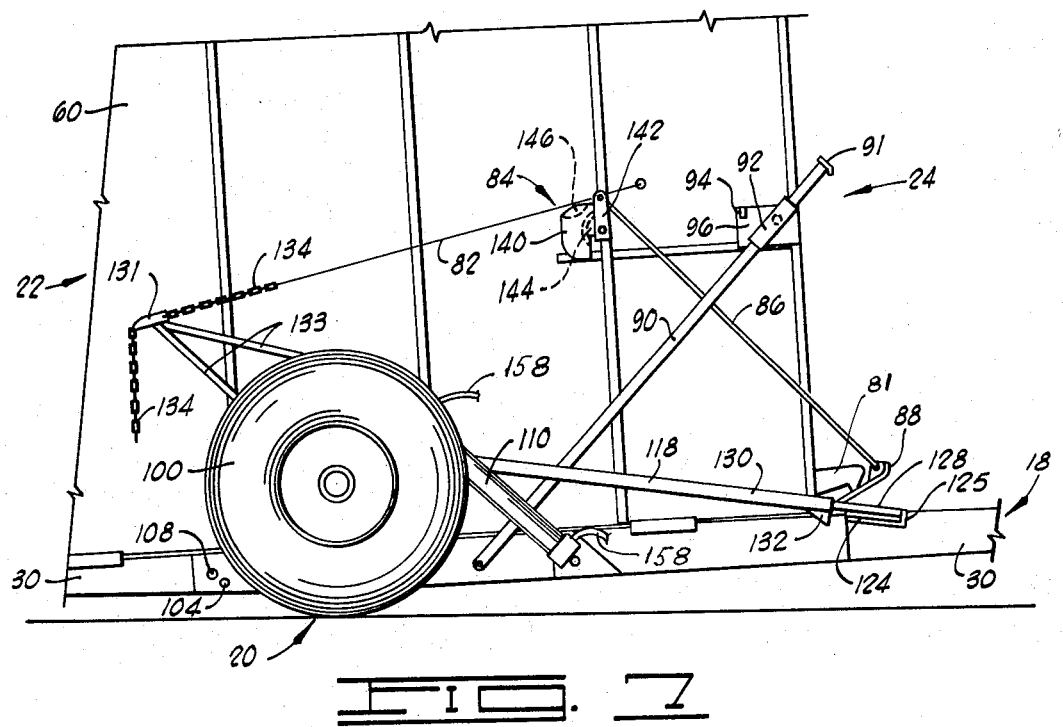
FIG. 7 is an enlarged side elevation view of the center portion of the stacker vehicle showing the wheel assembly in the raised position, the compressing apparatus, and the tilting and locking bar apparatus.
Figure 8:
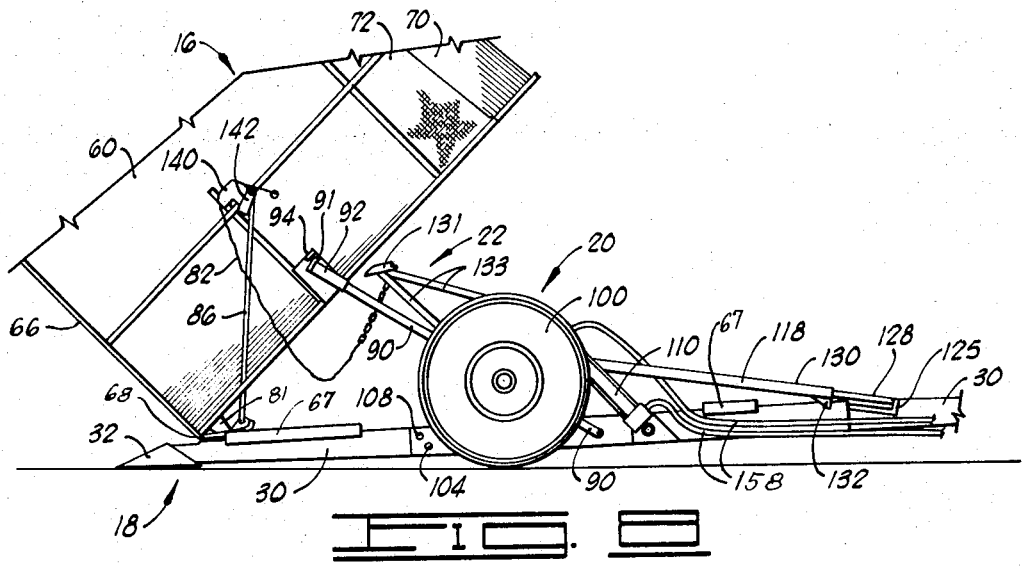
FIG. 8 is an enlarged side elevation view of the stacker vehicle's center portion in the wheels up position showing the housing in the full tilted position and the locking and tilting apparatus.

The forward wall 64 is attached to a cable 82 and connected to the compressing device 22 attached to the wheel assembly. The cable 82 passes through a cam lock assembly 84 mounted on the sidewall 60 which is operated by a tie rod 86 connecting the cam to a foot member 88 pivotably mounted on the forward edge of the housing as clearly shown in FIGS. 2 and 7. Tilting motion of the housing 16 is accomplished by rearward movement of the housing on the bed structure by the conveyor apparatus 36 and a tilt locking device generally indicated at 24 used to hold and pivot a forward portion of the housing. The tilt locking device 24 is best seen for description purposes in FIGS. 7 and 8. The tilt locking device 24 has a tilt bar 90 pivotably connected to the frame structure 30 extending upward therefrom having an extended head 91. The tilt bar 90 is mounted in a sleeve 92 that is pivotably attached to housing sidewalls 60 so it will turn as the housing tilts. The locking device 24 has a stop member 94 adapted to engage the extended head of the tilt bar 90 when in the fully tilted position. The sleeve 92 and stop 94 are mounted on an auxiliary plate 96 attached and extended slightly from the housing sidewall 60 so as to bring the tilt bar 90 in vertical alignment with the frame 30 so as to move freely when the housing 16 is tilted. FIG. 7 shows the tilt locking device 24 in the unlocked position with the housing 16 in place on the bed structure 30.

In the tilting operation as the housing moves rearward the locking device 24 moves as shown in the drawings. When the housing moves the locking bar 90 moves from the forward angular position shown in FIG. 2 rotating through the intermediate position shown in FIG. 3 and finally to the rearward angular position as shown in FIG. 4. When the housing 16 moves rearward and the locking bar 90 moves past the vertical position, the extended head begins to move toward the sleeve 92 and contacts the sleeve; at such time the housing 16 begins to tilt and rotate about its attached point 68. When the housing is in the full tilted position as in FIG. 4, the extended head 91 is between the stop 94 and the sleeve 92, thus preventing any inadvertent tilting of the housing 16. In the full tilted position the housing is held in position by the conveyor attachment 68 and locking device 24. When the housing is moved forward again the motion of the tilt locking device 24 is essentially reversed and the tilt bar 90 eventually returns to the position shown in FIG. 7. The overall function of this locking device is to hold in a relatively fixed position one portion of the forward end of the housing 16 enabling it to rotate about its connection 68 with the conveyor apparatus 36 and thus allow removal of the stack from the bed structure 18.

The stacker vehicle 10 is supported by the wheel assemblies 20 mounted on opposite sides of the trailer-like bed structure 18. Specific details of the wheel assembly construction are shown in FIGS. 9 and 10, where the wheel assembly is shown from the inside of the frame structure. The wheel assemblies 20 include a wheel 100 mounted on an axle 102 supported from the bed frame structure 30. The wheel axle 102 is pivotably mounted with the frame 30 as indicated at 104 and is basically a crank-shaped member attached to the frame structure 30 on one end and to the wheel 100 on the other end. The wheel and axle structure is designed so that the axle will pivot at the frame 30 maintaining the wheel in a ground contactable position in order to raise and lower the frame structure 30 relative to the ground as shown clearly in FIG. 9 and FIG. 10, respectively. The axle 102 is moved in the pivoting motion by an axle positioner 106 placed immediately above the axle. The axle positioner 106 is pivotably mounted at 108 with the frame structure 30 and is connected to a hydraulic cylinder 110 on its upper end. The axle positioner is rotated about the pivot 108 by the hydraulic cylinder 110 and rests on top of the axle 102 to press down on it in order to move the wheels 100 down relative to the frame structure. It is to be noted that pivotal motion of the axle 102 is not directly connected with pivoting motion of the axle positioner 106, that is, the axle 102 will pivot without the axle positioner 106 being moved; this is important in regard to operation of the shaking device.

Another feature of the wheel assembly 20 is the shaking device 23 that is integrally constructed with the wheel hubs and axle positioner 106. The shaking device is adapted to raise and lower the overall bed structure 18 relative to the ground rapidly in a shaking motion. It includes an eccentric shaped cam 111 on the interior of the wheel hub 112 fixed to the wheel hub and adapted to rotate with the wheel, a lifter assembly 114 with a roller 116 engagable with the cam 111 and a control rod 118 connected to the lifter assembly 114. The lifter assembly 114 is pivotably mounted with the axle positioner 106 at 120 and is a triangular member also pivotably connected to the control rod 118 and having the roller 116 mounted on the other corner. The lifter assembly 114 is rotated about the pivot 120 by the control rod 118 in order to bring the roller 116 into engagement with the eccentric cam 111 to actuate the shaker device. FIG. 9 shows the stacker structure with the wheel in a raised position and the axle positioner raised above the axle and the lifter assembly 114 moved to a no-contact position. FIG. 10 shows the wheel in a lowered position with the bed frame structure 30 raised above the ground and the lifter assembly 114 in a no-contact position. To actuate the shaking device the lifter assembly 114 is rotated so the roller 116 is moved downward into contact with the cam 111, such as done by movement of the control rod 118. As can be seen in FIG. 10, in order to actuate the shaker the control rod 118 moves to the left and the left end of which moves into the cutout portion 122 on the axle positioner thereby moving the roller 116 rearward or to the left and down to engage the cam 111. It is to be noted that the shaker requires the wheels to be in the down position so the lifter 114 will pivot the axle 102 about its mount 104 downward relative to the axle positioner 106 thereby raising the bed frame structure 30 relative to the ground. Also, due to the adjustable feature of the lifter rotation the roller 116 can be engaged with the cam 111 so as to pivot the axle 102 only a slight amount or a larger amount and thereby vary the shaking action. In normal operation the shaking apparatus 23 is engaged when the stacker vehicle is in the loaded condition and before the chopped material is removed from it, since the shaker device is adapted to compress the chopped material by shaking. Actual operation of the stacker vehicle has shown the shaker to be advantageous in providing a more compact stack which provides for a cleaner removal from the vehicle and better weathering characteristics.

Control of the shaker device 23 is accomplished by moving the control rod 118 forward and rearward while the vehicle is being pulled. In order to actuate and control the shaking device of the stacker vehicle a position control for the control rod 118 is provided in front of the bed structure which consists of a pair of triangular plates 124 movable so as to change the position of the control rod 118. More specifically, the triangular plates 124 rest on an extended portion of the frame structure indicated at 125 so the plates can slide horizontally thereon. The triangular plates 124 are connected by a spring 126 in tension and adapted to pull the plates toward the center of the structure. A pair of cables, not shown in the drawings, are connected one to each of the plates passing over a pulley mounted on the outer portion of the extended frame 125 and extending to the center of the structure where the cables are connected to a single cable, indicated at 127, used by the operator to pull the plates in an outward direction relative to the center of the structure and opposed to the spring action thereby moving the control rod 118 rearward. The control rod 118 consists of an inner portion 128 secured to the extended frame structure 125 and an outer portion 130 and enclosing the inner portion 128 and adapted to slide on same. The outer control rod portion 130 has a wedge 132 fixed to its forward lower end adapted to engage with the triangular plate 124. As the triangular plates move in and out, the rear incline surface thereof on the outside contacts the wedge 132 thus controlling the position of the outer control rod member 130. The outer control rod member 130 is connected to the lifter at assembly 114 as described above for the control rod 118. In order to engage the shaking apparatus the operator pulls the cable 127 thus moving the triangular plates 124 outward and in turn moving the control bar member 130 rearward and in turn engaging the roller 116 with the cam 111. The extent to which the roller 116 is engaged with the cam 111 depends directly upon the position of the control rod 118, and such is controlled by the operator.

When the operator desires to engage the shaking device 23, the stacker vehicle must be in the wheels down or transport position such as shown in FIG. 1 and FIG. 10. Pulling the cable 127 connected to the triangular plates 124 moves them outward and in turn moves the control rod member 130 rearward engaging the cam. Once the cam is engaged the roller contacts a portion of the cam and when it moves over the high spot it causes the axle 102 to move downward relative to the axle positioner and the frame structure 30. The amount which the axle 102 is pivoted depends upon the relative position of the roller 116 and the cam 111. When the operator pulls the cable 127 to engage the cam, it is necessary that the control cable 127 be held in a taut condition by means of a small chain attached to the end of the control cable 127 set in the desired notch of a chain holder located behind the operator on the tractor. To increase the amount of shake, the operator simply pulls the control cable 127 thereby moving the triangular plates outward and moving the control rod 118 further rearward. When the control is moved so that the amount of shake is increased, the control rod will move easily rearward as soon as the roller 116 drops from the high point of the cam 111 to low point thereof. In order to reduce the amount of shake, the stacker vehicle must be stopped and the wheel assemblies moved to the complete wheels up position wherein the axle positioner will lift a slight distance from the axle 102 thereby removing the roller 116 from the cam 111; at such time the spring 126 will pull the triangular plates 124 inward. When the transport position is again taken by the vehicle, the shaking can be initiated again if desired. The precise degree of shaking depends on many factors including the type of material enclosed in the stacker vehicle, its consistency, its moisture content, and the amount of compactness desired.

The compressing device has a cable operated apparatus to pull the front movable wall of the stacker housing 16 rearward when the stacker vehicle is put in the wheels up position. The forward movable wall 64 has a cable 82 attached thereto used to pull the wall rearward and compress the chopped material within the housing 16. To pull the cable 82 and compress the material, a cleat 131 is mounted on the axle positioner 106 extended therefrom on a pair of support members 133. The cleat 131 is adapted to hook a chain 134 connected to the cable 82. As shown in FIG. 7, the cleat 131 engages the chain 134 at some one point, and the chain 134 is sufficiently long to provide adjustment of the effective length of the cable. When the stacker vehicle housing 16 is full of chopped material, the material presses against the movable wall 64 pulling the chain 82 and cable 134 tight by the weight of the material alone. Compression of the material is accomplished by raising the wheels of the stacker vehicle thereby moving the axle positioner 106 rearward and along with it the cleat 131, thus pulling the cable 82 and chain 134 tight, thus pivoting the wall 64 rearward. The relative position of the cleat 131 in the wheels up and wheels down positions can be easily seen in comparing the relative positions of the components shown in FIG. 9 and FIG. 10. As the cleat 131 moves rearward when the axle positioner 106 pivots and moves rearward, the cable 82 and chain 134 are also moved rearward, thus pulling the movable wall 64 against the material.

When the stacker vehicle has been prepared for unloading the material, the compression device is left in the compressed position and the cam locking device 84 holds the movable wall 64 in the proper position during the unloading of the stack while the housing is being tilted. Once the stack has been removed from the vehicle 10, the movable wall 64 is positioned automatically back to its original position by foot plate 88 being forced up and releasing the cam lock 84.

The cam locking device 84 consists of a pair of plates 140 mounted on the housing sidewall with a cam and a stop mounted therebetween, the cam being rotatable by a lever 142 connected to the actuator rod 86. The cable 82 passes between the cam and the stop and is held in a fixed position when the cam is rotated to a lock position adjacent to the stop. The cam and the stop inside the locking device 84 are shown in FIG. 7 in dashed lines and are indicated at 144 and 146, respectively. The cam 144 is rotated to the lock position when the housing 16 is tilted and the foot 88 is pivoted upward as shown in FIG. 4. The overall function of the locking device 84 is to prevent forward motion of the movable wall 64 as the housing tilts. In practice it has been found that keeping the movable wall 64 in a fixed position helps maintain the overall shape of the stack. It is to be noted that as soon as the housing 16 moves from the tilted position the cam lock device 84 releases the cable 82 so the movable wall will fall forward and back to its original position for another load.

The controls necessary to operate the stacker vehicle 10 of this invention are very simple and adapted for operation of the vehicle by one man and a tractor having a hydraulic system takeoff. The hydraulic controls are connected to the conveyor operating motor 46 and to the hydraulic cylinders 110. Another mechanical control operable from the tractor is associated with the shaker apparatus. The mechanical control for the compressing device 22 is the length adjustment of the chains 134. The hydraulic control is primarily operated by a single valve 50 mounted on the vehicle tongue 34. The valve 50 is a two-way valve having two inlets and four outlets used to pass high pressure operating fluid and lower pressure return fluid and is operated by a spring loaded lever 150 moved by a control cable 152 which is connected with the tractor. The two-way valve 50 is used in conjunction with a flow reversal valve in the tractor's hydraulic system so that high pressure fluid can be passed in either direction. The two-way valve 50 is provided with the spring loaded lever 150 to move it into the normally rearward position which causes hydraulic fluid to pass through the hydraulic motor 46 and move the conveyor 36. When the control cable 152 is pulled, the lever 150 changes position of the valve 50 to a forward position so that hydraulic fluid is directed to the wheel cylinders 110. When the two-way valve 50 is in either position, the flow reversal valve at the tractor is used to change the direction of the fluid through the valve so as to operate the hydraulic motor 46 or the wheel cylinders 110 in either direction. The hydraulic lines 154 connect the valve 50 to the tractor; the lines 156 connect the valve 50 to the hydraulic motor 46; and the lines 158 connect the valve 50 to the hydraulic wheel cylinders 110.

The shaker 23 is controlled by a shaker control cable connected to triangular plates 124 as described hereinabove and not shown in the drawings to avoid confusion and for clarity. The shaker control cable 127 is connected to some point on the tractor within easy grasp of the operator. The shaker control cable 127 extends forward from its connection with the triangular plates 124, passes through a pulley at the hinge point on the tongue 34 and is connected to the tractor near the operator. The control cable 127 must be taut at all times to hold the position of the plates 124 in position against the force of the springs 126.

Control of the compressing device 22 requires the operator to set the chains 134 in the cleats 131 so as to position the movable wall 64 at the forward edge of the housing 16 before filling the stacker with chopped material. Once the stacker 10 is full, the operator lowers the bed structure 30 to the ground thereby pulling the movable wall 64 to the rear and compressing the chopped material. When the compression has been completed, the stacker vehicle 10 can be unloaded with the movable wall 64 in the last position; and it is locked in this position unitl it is released by the foot plate 88 touching down and releasing the cam locking device 84 at which time the movable wall 64 will fall to its original position for another load. In practice it has been found usually necessary to reset the chains 134 in the cleats 131 when a different type of material is loaded in the stacker vehicle due to the difference in compressibility.

In preferred use and operation, the stacker vehicle 10 is pulled behind a chopping and blowing device 12 by a tractor 14 as material is picked up from the field and loaded into the stacker. As shown in FIG. 1, the stacker vehicle 10 is connected behind a forage harvester (or any harvesting machine with a blower) having windrow pick-up attachment and is pulled by a tractor 14. In a preferred use of the stacker vehicle, it is pulled behind the forage harvester 12 which is used to pick up hay that has been previously cut and laid in rows in the field. The forage harvester picks up the material from the field, chops it and blows it through a spout 160 into the upper forward portion of the housing 16 above the forward and movable wall 64 through the opening indicated at 76 in FIG. 5. The perforated portion of the housing 72 allows the air accompanying the material to pass from the housing 16 through the outside while retaining the material therein. Additionally, the perforated portion 72 allows the air caught by the aperture 76 associated with the normal forward movement of the vehicle to pass from the housing 16. The perforated portion 72 provides for a continuous airflow through the housing 16 thus enabling the chopped material to more easily pass into the housing and lessen the possiblity of lost material. As the stacker vehicle 10 is loaded, the material will deposit inside the housing 16 and fill the cavity between the sidewall. The stacker can be filled until the material is approximately up to the perforated portion 72 or so long as it is enclosed within the imperforate sidewall portions 60, 62, and 64; at such time the stacker is full and should be unloaded.

Figure 3:
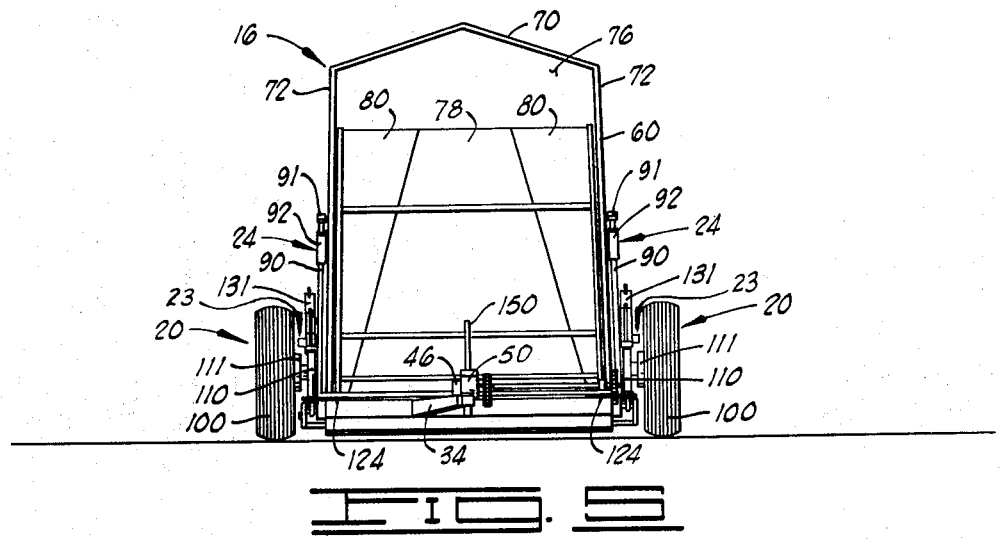
FIG. 3 is a side elevation view of the stacker vehicle in the wheels up position with the housing moved rearward a distance on the bed and overhanging the rear of the bed.

Unloading of the stacker vehicle can be done in substantially any place wherein the vehicle itself can be positioned with sufficient allowances for tilting of the housing 16. Before the stacker 10 is unloaded the material can be compressed using the compressing device 22 and the shaker as described above. Typically, the stacker will become full when the vehicle is a distance away from the point where the stack is to be placed during the time of transport between where the vehicle is full and the stacker is to be placed. The shaker device 23 can be utilized to compact the load of material while the vehicle is moving to the place where the stack is to be put. Once the stacker vehicle is at the place where the stack is to be put, the compressing device 22 can be used at that time conveniently to further compress the material prior to removal of the stack. In positioning the stacker vehicle 10 for removal of the stack, the fork 32 should be approximately where the rear of the stack is to be located when the finished stack is on the ground. After compression of the stack the two-way valve 50 and the direction control valve are positioned to operate the wheel cylinder 110 and place the bed frame structure 30 on the ground with the fork 32 touching the ground; then the controls are manipulated to operate the hydraulic motor 46 and move the conveyor 36 rearward sliding the housing 16 along the frame structure 30. The position of the stacker vehicle 10 at this time is shown in FIG. 3. At this time the stack in the housing 16 moves rearward off of the bed structure 18 while the tractor 14 pulls the stacker vehicle 10 forward at the same rate, so the stack in the housing remains substantially stationary relative to the ground and the vehicle bed structure 18 moves out from under the stack. It is to be noted the relative size of the fork 32 in the drawings is somewhat exaggerated and in actuality it is smaller. When the stack is moved from the vehicle bed structure 18, it is very close to the ground and material on the bottom of the stack is disturbed very little when being unloaded. When the housing 16 reaches the rearmost portion of the bed structure 18, it is in the full tilted position and the stack is substantially exposed and no longer in contact with the housing. At this time the stacker vehicle 10 is pulled forward leaving the stack sitting on the ground directly behind the rear of the stacker vehicle. It is to be noted that the angle to which the housing 16 tilts enables the rear portion of the rear wall 62 to rise above the height of the stack thereby not disturbing the upper portion of the stack when the stacker vehicle 10 is pulled away. Once the stacker vehicle is pulled clear of the stack, the housing 16 is repositioned on the bed 18 by reversing the hydraulic motor 46 and in turn the conveyor 36; and then the wheel assemblies 20 are repositioned into the transport position so that the stacker can be reused.

Another feature of the stacker vehicle 10 is that in addition to loading material and placing stacks it can be used for loading previously placed stacks transporting them to another location and unloading them. This transfer of stacks by using the stacker vehicle 10 is accomplished in much the same way that they are unloaded. In order to transport a previously placed stack, the housing 16 of the stacker vehicle 10 must be tilted to the position shown in FIG. 4 with the bed structure 18 near the ground; at such time it can be backed into position adjacent to one end of a stack, the bed structure lowered to the ground, the conveyor 36 operated in a forward direction, after the fork 32 is placed under the forward edge of the stack and the stacker vehicle 10 moved rearward until the stack is pulled onto the bed structure 18 and the housing 16 lowered over it. When the stack has been enclosed in the housing, the wheel assemblies can be positioned in a transport position and the stack moved to any convenient or desired place and unloaded in the same manner as previously described. The fork 32 on the rear of the bed is an aid when reloading stacks because it will pick up the portion of the stack from the ground and guide it onto the bed structure 18 as the vehicle is moved rearward underneath the stack. This operation as well as the normal unloading operation can be easily performed by one man operating the stacker vehicle and the tractor simultaneously. In the relocating operation of the stacker vehicle the forage harvester 12 does not have to be connected between the tractor 14 and the stacker vehicle 10.

In the manufacture of the stacker vehicle structure 10 of this invention, it is obvious that the vehicle can be constructed by the same methods currently used to manufacture farm machinery in order to achieve the end product. The conveyor and bed structure of the stacker vehicle are constructed in much the same way as a simple trailer with the conveyor 36 operating over the floor of the trailer. The structure of the bed 18 and wheel assemblies 20 can be made sufficiently strong to safely load and carry a stack weighing 5 tons and more which is the approximate weight of the nominal and conventionally sized haystacks that other prior art and similar stacking vehicles produce. The housing 16 can be constructed around a frame structure as shown in the drawings or other similar structure wherein the sidewalls are substantially smooth on the inside thereof to form the stack in a smooth and uniform tapered shape. The hydraulic components of the vehicle are of a standard nature and simple in construction thus easily obtained for manufacture of the complete vehicle.

In the use and operation of the stacker vehicle structure 10 of this invention, it is seen that same provides a device for the loading, transporting, and stacking of chopped material which can be operated by one person. The stacker vehicle 10 is preferably used for the loading of chopped material picked up by a forage harvester in the field and transporting the stack inside the vehicle to an appropriate place where the stack is unloaded from the vehicle. In addition to this the stacker vehicle 10 can be used to reload a previously placed stack into the vehicle and transport it to another place where the stack can be unloaded from the vehicle 10 onto the ground. In the actual loading and unloading operations of the stacker vehicle one person is all that is required for its normal operation.

As will become apparent from the foregoing description of the applicant's stacker vehicle structure 10, relatively simple means have been provided to collect chopped material from a forage harvester, form same into a stack, transport the stack to a desired location for the stack, and place the stack on the ground. Additionally, the stacker vehicle structure 10 can be used to transport a stack previously placed. The stacker vehicle is economical in that only one person is required to operate the vehicle in the field, and the vehicle is economical in construction costs due to its simplicity in design and structure. The stacker vehicle structure is simple to use in that only one person is required for its operation, and that person can conduct all operations with the vehicle while seated on the tractor. The stacker vehicle structure is adapted to be used over and over in a relatively rapid fashion, and in practice it has been shown to produce stacks having uniform sidewalls and good weathering characteristics due to the shape of the stack produced by the device.

While the invention has been described in conjunction with preferred specific embodiments thereof, it will be understood that this description is intended to illustrate and not to limit the scope of the invention, which is defined by the following claims.

I claim:

1. A stacker vehicle comprising:
   a. bed means having means for ground supporting same,
   b. conveyor means mounted on said bed means,
   c. stack enclosure means having a material receiving means and mounted on said bed means, said enclosure means operatively connected at the front thereof to said conveyor means to move therewith,
   d. means to tilt said enclosure means, and
   e. means to operate said conveyor means and means to tilt said enclosure means, wherein said means to tilt said enclosure means is operatively connected to said enclosure and conveyor means to tilt same upon rearward movement of said conveyor and enclosure relative to said bed,
   said stacker vehicle is adapted to be loaded with material, and to unload said material in a stack onto the ground.

2. The vehicle of claim 1, wherein there is material compacting means connected to said ground supporting and enclosure means and adapted upon movement of said ground supporting means relative said ground to move inwardly said enclosure to compact material therein.

3. The vehicle of claim 2, wherein said ground supporting means is wheels mounted on said bed means, and there is means to operate said compacting means.

4. The vehicle as described in claim 1, wherein:
   a. said bed means has a frame with said conveyor means mounted thereon,
   b. said ground supporting means are wheel means having means to raise and lower said bed means relative to the ground,
   c. said conveyor means has an inlet belt means movable in a forward and a reverse direction,
   d. said stack enclosure means has a housing defining a cavity for the receipt of material, and
   e. said means to tilt said stack enclosure means has a pivotal attachment between the forward end of said housing and said conveyor belt means and a tilting hand locking means connecting said housing and said bed means adapted to pivot said housing at said pivotal attachment when said forward portion of said enclosure is at the rear portion of said conveyor belt means and to hold said housing in said tilted position until said conveyor belt means is moved forward.

5. The vehicle of claim 4, wherein there is a material compacting means mounted on said housing and operatively connected to said wheel means to compress material in said housing upon movement of said vehicle.

6. The vehicle as described in claim 5, wherein:
 a. said frame has the top portion of said conveyor means at the top portion thereof, said conveyor means substantially covering the upper surface of said frame,
 b. said wheel means has a wheel and an axle, said axle being pivotally mounted with said frame,
 c. said means to raise and lower said bed means relative to the ground has an axle positioner pivotally mounted with said frame positioned above said axle adapted to in operation press downward on said axle to lower said wheel relative said frame and raise said frame relative to the ground,
 d. said housing has an aperture to receive material and it has a perforated portion to pass air through said housing.
 e. said housing means has a housing frame means on the lower portion of said enclosure means adapted to engage the peripheral portion of said frame,
 f. said means to compact material has a pivotable wall of said housing connected to said axle positioner adapted to be pulled inward in a pivoting motion by motion of said axle positioner,
 g. said means to shake said stacker vehicle has a cam attached to the hub of said wheel mounted on said axle engagable by a cam follower means on said axle positioner adjustably movable by an actuator means, and
 h. said tilting and locking means has a locking bar member pivotally attached to said frame and pivotally and slidably attached to the side of said housing on the forward center portion thereof and has a stop member extending from said housing adapted to engage the end portion of said locking bar member when said housing is in the fully tilted position.

7. The vehicle as described in claim 6, wherein:
 a. said frame means has a floor on the upper surface thereof and said conveyor means has a slatted belt with the slats thereof in contact with said floor surface,
 b. said axle is a crank-like member having one of the parallel portions pivotally secured to the frame, said wheel is rotatably mounted with the other parallel portion and the transverse connecting portion is alongside the side of said frame,
 c. said housing has fixed walls on the sides and rear thereof secured to said housing frame means extending upward therefrom and tapered inward to said top portion, said sidewalls having said perforated portion in their upper portion, said pivotable wall mounted between said sidewalls at the forward end thereof pivotable from said housing frame means and extending upward to the height of said perforated portion,
 d. said aperture to receive material is on the forward upper portion of said housing bordered by said top portion, said perforated portions and the top of said pivotable wall,
 e. said pivotable wall is connected to said axle positioner by a table means adjustably connectable with said axle positioner and adapted to be held in place by a cam locking means when said housing is tilted, and
 f. said cam follower means has a cam roller pivotally mounted on said axle positioner movable by a controlled rod into the circle of said cam attached wheel hub, said actuator means has a movable plate with an incline surface, said incline surface in contact with said control rod adapted in operation to move said control rod in response to lateral movement of said plate thereby changing the position of said cammed roller relative said wheel hub cam.

* * * * *